United States Patent
Seo et al.

(10) Patent No.: US 9,951,732 B2
(45) Date of Patent: Apr. 24, 2018

(54) FUEL INJECTION AMOUNT CONTROL DEVICE

(71) Applicants: Hiromitsu Seo, Toyota (JP); Tomoyuki Uchiyama, Nisshin (JP); Takuya Takei, Toyota (JP); Tomohiko Satomi, Nagoya (JP)

(72) Inventors: Hiromitsu Seo, Toyota (JP); Tomoyuki Uchiyama, Nisshin (JP); Takuya Takei, Toyota (JP); Tomohiko Satomi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/773,799

(22) PCT Filed: Apr. 7, 2014

(86) PCT No.: PCT/IB2014/000487
§ 371 (c)(1),
(2) Date: Sep. 9, 2015

(87) PCT Pub. No.: WO2014/167396
PCT Pub. Date: Oct. 16, 2014

(65) Prior Publication Data
US 2016/0017851 A1 Jan. 21, 2016

(30) Foreign Application Priority Data
Apr. 9, 2013 (JP) .................................. 2013-081310

(51) Int. Cl.
*F02M 53/06* (2006.01)
*F02D 7/00* (2006.01)
(Continued)

(52) U.S. Cl.
CPC .............. *F02M 53/06* (2013.01); *F02D 7/00* (2013.01); *F02D 19/0605* (2013.01);
(Continued)

(58) Field of Classification Search
CPC ...... F02M 31/125; F02M 53/00; F02M 53/02; F02M 53/06; F02D 19/0605;
(Continued)

(56) References Cited

U.S. PATENT DOCUMENTS

| | | | | |
|---|---|---|---|---|
| 4,543,937 A | * | 10/1985 | Amano | F02D 41/061 123/491 |
| 4,770,135 A | * | 9/1988 | Jautelat | F02D 41/2422 123/179.17 |

(Continued)

FOREIGN PATENT DOCUMENTS

| | | | | |
|---|---|---|---|---|
| DE | 19952344 A1 | * | 5/2001 | ............. F02D 41/06 |
| DE | 102008056892 A1 | * | 5/2010 | ......... F02D 19/0605 |

(Continued)

*Primary Examiner* — Lindsay Low
*Assistant Examiner* — John Zaleskas
(74) *Attorney, Agent, or Firm* — Oliff PLC

(57) ABSTRACT

An EFI-ECU determines an initial value of a correction value ekthwst for correcting an injection correction amount with reference to a non-heating initial value map if a heater is in operation, and determines the initial value of the correction value ekthwst for correcting the injection correction amount with reference to a heating initial value map if the heater is out of operation. It should be noted herein that the initial value of the correction value ekthwst is set lower under the same condition in the heating initial value map than in the non-heating initial value map.

6 Claims, 8 Drawing Sheets

(51) Int. Cl.
*F02D 41/06* (2006.01)
*F02M 31/125* (2006.01)
*F02D 41/34* (2006.01)
*F02D 19/06* (2006.01)
*F02D 19/08* (2006.01)
*F02D 33/00* (2006.01)

(52) U.S. Cl.
CPC ......... *F02D 19/084* (2013.01); *F02D 41/064* (2013.01); *F02D 41/34* (2013.01); *F02M 31/125* (2013.01); *F02D 33/006* (2013.01); *F02D 2200/0606* (2013.01); *Y02T 10/126* (2013.01); *Y02T 10/36* (2013.01); *Y02T 10/44* (2013.01)

(58) Field of Classification Search
CPC ...... F02D 19/084; F02D 41/064; F02D 41/34; F02D 33/006; F02D 2200/0606; F02D 7/00
USPC ..... 123/179.16, 179.21, 491, 543, 549, 557; 701/103–105, 113
See application file for complete search history.

(56) References Cited

U.S. PATENT DOCUMENTS

| | | | | |
|---|---|---|---|---|
| 4,823,757 A * | 4/1989 | Redele | ............... | F02M 53/02 123/381 |
| 4,982,709 A * | 1/1991 | Oota | ............... | F02D 19/0628 123/1 A |
| 5,038,730 A * | 8/1991 | Kashima | ............... | F02D 19/0605 123/1 A |
| 5,044,331 A * | 9/1991 | Suga | ............... | F02D 41/064 123/169 PB |
| 5,076,238 A * | 12/1991 | Rosenau | ............... | F02D 41/061 123/491 |
| 5,213,082 A * | 5/1993 | Abe | ............... | F02D 41/064 123/179.16 |
| 5,301,648 A * | 4/1994 | Uchinami | ............... | F02D 19/0628 123/1 A |
| 5,402,763 A * | 4/1995 | Saito | ............... | F02D 19/0605 123/1 A |
| 5,441,030 A * | 8/1995 | Satsukawa | ............... | F02D 41/064 123/478 |
| 5,894,832 A * | 4/1999 | Nogi | ............... | F02D 9/10 123/179.15 |
| 6,718,960 B2 * | 4/2004 | Someno | ............... | F02D 37/02 123/478 |
| 2001/0039936 A1 * | 11/2001 | Ichihara | ............... | F02D 41/047 123/299 |
| 2002/0046729 A1 * | 4/2002 | Kyuuma | ............... | F02D 41/047 123/295 |
| 2002/0088433 A1 * | 7/2002 | Nagano | ............... | F02D 41/0255 123/431 |
| 2003/0178010 A1 * | 9/2003 | Pellizzari | ............... | F02D 41/003 123/549 |
| 2004/0000296 A1 * | 1/2004 | Linna | ............... | F02D 41/003 123/549 |
| 2004/0003801 A1 * | 1/2004 | Linna | ............... | F02D 41/003 123/549 |
| 2005/0060086 A1 * | 3/2005 | Abe | ............... | F02D 41/3005 701/103 |
| 2005/0066939 A1 * | 3/2005 | Shimada | ............... | F02D 41/0007 123/431 |
| 2005/0126551 A1 * | 6/2005 | Mello | ............... | F02D 19/0605 123/549 |
| 2005/0211229 A1 * | 9/2005 | Pellizzari | ............... | F02D 41/003 123/525 |
| 2008/0053415 A1 * | 3/2008 | Marriott | ............... | F02M 31/125 123/549 |
| 2008/0114527 A1 * | 5/2008 | McCarthy | ............... | F02D 41/064 701/113 |
| 2008/0127918 A1 * | 6/2008 | Wineland | ............... | F02M 53/06 123/90.11 |
| 2008/0127940 A1 * | 6/2008 | Stephan | ............... | F02M 53/06 123/445 |
| 2008/0127951 A1 * | 6/2008 | Gale | ............... | F02D 41/20 123/549 |
| 2008/0208438 A1 * | 8/2008 | Sukegawa | ............... | F02D 41/047 701/105 |
| 2009/0076706 A1 * | 3/2009 | Nakamura | ............... | F02D 35/003 701/103 |
| 2009/0178651 A1 * | 7/2009 | Gale | ............... | F02D 41/064 123/472 |
| 2009/0314260 A1 * | 12/2009 | Maeda | ............... | F02D 19/0605 123/491 |
| 2010/0036587 A1 * | 2/2010 | Kato | ............... | F02D 41/0025 701/103 |
| 2010/0199953 A1 * | 8/2010 | Tsunooka | ............... | F02D 41/406 123/491 |
| 2011/0132320 A1 * | 6/2011 | Ulrey | ............... | F02D 41/005 123/299 |
| 2013/0275025 A1 * | 10/2013 | Isenberg | ............... | F02M 53/06 701/103 |

FOREIGN PATENT DOCUMENTS

| | | | |
|---|---|---|---|
| JP | 2002-004918 A | | 1/2002 |
| JP | 2002004918 A | * | 1/2002 |
| JP | 2002195110 A | * | 7/2002 |
| JP | 2002266712 A | * | 9/2002 |
| JP | 2004-028063 A | | 1/2004 |
| JP | 2009-287488 A | | 12/2009 |
| JP | 2010-001765 A | | 1/2010 |
| JP | 2014-137042 A | | 7/2014 |

* cited by examiner

FUEL INJECTION AMOUNT CONTROL DEVICE

BACKGROUND OF THE INVENTION

1. Field of the Invention

The invention relates to a fuel injection amount control device.

2. Description of Related Art

There is known a fuel injection amount control device that is equipped with a plurality of injectors that inject fuel into a plurality of cylinders of an internal combustion engine respectively, a delivery pipe that distributes fuel to the plurality of the injectors, a delivery pipe heater that heats fuel in the delivery pipe, fuel heating control means for controlling the operation of the delivery pipe heater, and fuel injection control means for controlling the injection of fuel from the plurality of the injectors, the fuel injection control means injecting heated fuel sequentially from that one of the injectors which is located closest to an inlet of the delivery pipe in the case where the fuel is heated by the fuel heating control means during initial injection of the plurality of the injectors (e.g., see Japanese Patent Application Publication No. 2009-287488 (JP-2009-287488 A)).

SUMMARY OF THE INVENTION

However, this fuel injection amount control device determines a fuel injection amount on the basis of a temperature of coolant of the internal combustion engine, a concentration of alcohol in fuel, and a load of the internal combustion engine, but does not take into account a temperature of the fuel heated by the delivery pipe heater.

Thus, the aforementioned fuel injection amount control device may cause an excessive richness of the air-fuel ratio due to a relatively large amount of fuel injection resulting from a low temperature of coolant, despite the promotion of vaporization of fuel through heating, during a startup period of the internal combustion engine.

Besides, the aforementioned fuel injection amount control device may cause an excessive richness of the air-fuel ratio due to a relatively large amount of fuel injection resulting from a relatively large estimated amount of fuel adhering to a wall surface, despite a decrease in the amount of fuel adhering to the wall surface in the vicinity of an input port of the internal combustion engine through the heating of fuel, during the startup period of the internal combustion engine.

In this manner, the aforementioned fuel injection amount control device does not take into account the temperature of fuel heated by the delivery pipe heater, and hence cannot appropriately adjust the air-fuel ratio during the startup period of the internal combustion engine, thus creating a problem of a deterioration in the startup performance of the internal combustion engine.

The invention provides a fuel injection amount control device that can improve the startup performance of an internal combustion engine.

An aspect of a fuel injection amount control device according to the invention is constituted of (1) a fuel heater that heats fuel that is supplied to an internal combustion engine, and an electric control unit configured to adjust a correction amount of a fuel injection amount for the internal combustion engine. The electric control unit is configured to adjust the correction amount of the fuel injection amount such that the correction amount of the fuel injection amount in a state where the fuel heater is out of operation and the correction amount of the fuel injection amount in a state where the fuel heater is in operation become different from each other during a startup period of the internal combustion engine.

Owing to this configuration, the fuel injection amount control device adjusts the correction amount of the fuel injection amount depending on whether or not fuel is heated during the startup period of the internal combustion engine, and hence can improve the startup performance of the internal combustion engine.

In the aforementioned aspect, the electric control unit may adjust the correction amount of the fuel injection amount in the state where the fuel heater is in operation, such that a difference between the correction amount of the fuel injection amount in the state where the fuel heater is out of operation and the correction amount of the fuel injection amount in the state where the fuel heater is in operation decreases in accordance with engine rotation of the internal combustion engine, during the startup period of the internal combustion engine.

Owing to this configuration, the fuel injection amount control device makes it less necessary to take the temperature of fuel into account as the temperature of coolant rises through operation of the internal combustion engine, and hence can more finely improve the startup performance of the internal combustion engine.

In the aforementioned aspect, the electric control unit may adjust the correction amount of the fuel injection amount such that a damping factor of the correction amount of the fuel injection amount in the state where the fuel heater is in operation rises as an operation amount of the fuel heater increases, during the startup period of the internal combustion engine.

Owing to this configuration, the fuel injection amount control device is designed such that the rate of rise in the temperature of coolant rises as the operation amount of the fuel heater increases, and hence can appropriately adjust the correction amount of the fuel injection amount by raising the damping factor of the correction amount of the fuel injection amount.

In the aforementioned aspect, the electric control unit may adjust the correction amount of the fuel injection amount such that a damping factor of the correction amount of the fuel injection amount in the state where the fuel heater is in operation falls as an operation amount of the fuel heater decreases, during the startup period of the internal combustion engine.

Owing to this configuration, the fuel injection amount control device is designed such that the rate of rise in the temperature of coolant falls as the operation amount of the fuel heater decreases, and hence can appropriately adjust the correction amount of the fuel injection amount by lowering the damping factor of the correction amount of the fuel injection amount.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The embodiments of the invention will be described hereinafter with reference to the drawings.

First Embodiment

Figure 1:
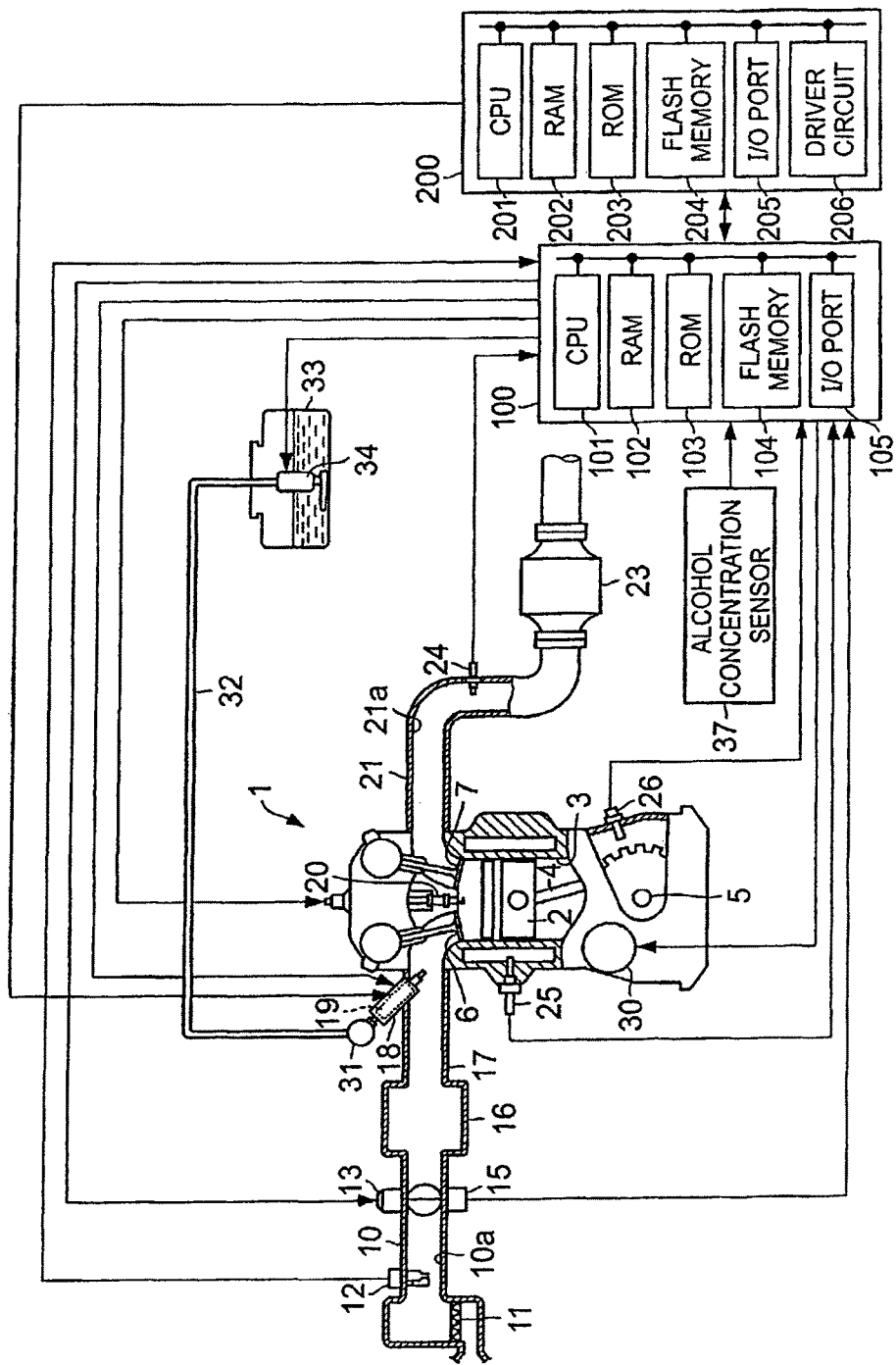
FIG. 1 is a block diagram showing the configuration of a vehicle to which a fuel injection amount control device according to the first embodiment of the invention is applied.

As shown in FIG. 1, a vehicle that is mounted with a fuel injection amount control device according to the first embodiment of the invention is equipped with an engine 1 as an internal combustion engine, an electric fuel injection-electronic control unit (an EFI-ECU) 100 for controlling the fuel injection amount for the engine 1, and a heating ECU 200 that controls the temperature of fuel injected into the engine 1.

The engine 1 is constituted by a four-cycle engine that carries out a series of four strokes consisting of a suction stroke, a compression stroke, an expansion stroke, and an exhaust stroke while a piston 2 reciprocates twice in each cylinder 3, and carries out ignition during the compression stroke and the expansion stroke.

The piston 2 is coupled to a crankshaft 5 via a connecting rod 4. The connecting rod 4 converts reciprocating movements of the piston 2 into rotational movements of a crankshaft 5.

Fuel that is used for the engine 1 is blended fuel containing alcohol such as ethanol, methanol or the like. That is, the engine 1 is an FFV engine that is mounted on a so-called flexible fuel vehicle (an FFV) that can utilize blended fuel obtained by blending hydrocarbon fuel such as gasoline or the like with alcohol fuel.

The engine 1 can operate by only gasoline, blended fuel containing alcohol and gasoline, or only alcohol. That is, the concentration of alcohol in the fuel supplied to the engine 1 can be changed from 0% (only gasoline) to 100% (only alcohol).

An intake pipe 10 is connected to the engine 1, and an intake passage 10a is formed in this intake pipe 10. An air cleaner 11 is provided in a most upstream portion of the intake passage 10a. Besides, an air flow meter 12 that detects an intake air amount Ga is provided downstream of the air cleaner 11.

A throttle valve 14 whose opening degree is adjusted by a throttle motor 13 is provided downstream of the air flow meter 12. A throttle opening degree sensor 15 is provided adjacently to the throttle valve 14, downstream of the air flow meter 12. The throttle opening degree sensor 15 detects an opening degree of the throttle valve 14 (a throttle opening degree).

A surge tank 16 is provided downstream of the throttle valve 14. An intake manifold 17 that introduces air into each of cylinders formed in the engine 1 is connected to the surge tank 16.

An intake valve 6 for controlling the introduction of air for combustion is provided between each of the cylinders and the intake manifold 17. A fuel injection valve 18 that injects fuel is fitted in the vicinity of an intake port of the intake manifold 17 of each of the cylinders.

A cylinder head of the engine 1 is fitted with an ignition plug 20 for each of the cylinders. The ignition plug 20 is constituted by a known ignition plug that has electrodes made of a platinum alloy, an iridium alloy, or the like.

That is, the ignition plug 20 causes spark discharge between the electrodes, thereby igniting fuel injected into each of the cylinders. The EFI-ECU 100 controls the timing when each ignition plug 20 causes spark discharge.

An exhaust pipe 21 is connected to an exhaust port side of the engine 1. An exhaust valve 7 for controlling the discharge of exhaust gas is provided between each of the cylinders and the exhaust pipe 21. The exhaust pipe 21 is provided with an exhaust gas purification device 23 having a three-way catalyst or the like that purifies exhaust gas.

An air-fuel ratio sensor 24 that detects an air-fuel ratio in exhaust gas is fitted upstream of the exhaust gas purification device 23. Besides, a cylinder block of the engine 1 is provided with a coolant temperature sensor 25 that detects a temperature of coolant of the engine 1 (hereinafter referred to simply as "an engine coolant temperature") T.

A crank angle sensor 26 that outputs a pulse signal every time the crankshaft 5 rotates by a predetermined crank angle is provided on an outer peripheral side of the crankshaft 5. The EFI-ECU 100 calculates an engine rotational speed of the engine 1 (hereinafter referred to simply as "an engine rotational speed") Ne on the basis of a pulse signal that is output from the crank angle sensor 26.

Besides, the engine 1 is provided with a starter 30 for rotationally driving (cranking) the crankshaft 5 during startup. The starter 30 cranks the engine 1 in accordance with the control performed by the EFT-ECU 100.

The fuel injection valve 18 is connected to a fuel tank 33 via a delivery pipe 31 and a fuel pipe arrangement 32. In this embodiment of the invention, blended fuel containing alcohol and gasoline is stored in the fuel tank 33.

An electrically operated fuel pump 34 is provided in the fuel tank 33. The fuel stored in the fuel tank 33 is pumped up by this fuel pump 34, and is force-fed to the fuel pipe arrangement 32. Incidentally, the fuel pump 34 is provided in the fuel tank 33 in this embodiment of the invention. However, the fuel pump 34 may be provided outside the fuel tank 33.

The fuel discharged from the fuel pump 34 is force-fed to the delivery pipe 31 through the fuel pipe arrangement 32, and is distributed from the delivery pipe 31 to the fuel injection valve 18 of each of the cylinders. An alcohol concentration sensor 37 is provided in a fuel supply system from the fuel tank 33 to the delivery pipe 31.

The alcohol concentration sensor 37 is provided in, for example, the fuel tank 33, the fuel pipe arrangement 32, or the delivery pipe 31, and detects an alcohol concentration C in the fuel injected from the fuel injection valve 18.

It should be noted herein that since an FFV engine such as the engine 1 can use blended fuel obtained by blending alcohol such as ethanol, methanol or the like with gasoline, it is known that the concentration of alcohol in fuel has a great influence on the state of combustion in each of the cylinders.

That is, gasoline contains low boiling point components, and hence has a characteristic of being likely to vaporize at low temperatures as well. On the other hand, alcohol has a characteristic of having a high boiling point (e.g., about 78° C. in the case of ethanol).

Accordingly, fuel with a high concentration of alcohol is unlikely to vaporize at a temperature that is lower than the boiling point of alcohol. Thus, the fuel injection valve 18 has therein a heater 19 for raising the temperature of fuel for the purpose of promoting the vaporization of fuel at low temperatures.

That is, the heater 19 heats fuel that is supplied from the fuel tank 33 to the engine 1 and injected from the fuel injection valve 18. In this embodiment of the invention, the heater 19 is constituted by, for example, an electrically driven known heater.

The EFI-ECU 100 is constituted by a microprocessor that is equipped with a central processing unit (a CPU) 101, a random access memory (a RAM) 102, a read only memory (a ROM) 103, a flash memory 104, an input/output port (hereinafter referred to simply as "an I/O port") 105.

In addition to various control constants, various maps and the like, a program for causing the microprocessor to function as the EFI-ECU 100 is stored in the ROM 103 of the EFI-ECU 100.

That is, the CPU 101 of the EFI-ECU 100 executes the program stored in the ROM 103, using the RAM 102 as a working area, whereby the microprocessor functions as the EFI-ECU 100.

Various sensors etc. such as the air flow meter 12, the throttle opening degree sensor 15, the air-fuel ratio sensor 24, the coolant temperature sensor 25, the crank angle sensor 26, the alcohol concentration sensor 37 and the like are connected to an input side of the I/O port 105 of the EFI-ECU 100.

Various control targets etc. such as the throttle motor 13, the fuel injection valve 18, the ignition plug 20, the starter 30, the fuel, pump 34 and the like are connected to an output side of the I/O port 105 of the EFI-ECU 100.

The EFI-ECU 100 controls the various control targets etc. that are connected to the output side of the I/O port 105, in accordance with an operation state of the engine 1 that is determined on the basis of detection signals that are input from the various sensors etc. that are connected to the input side of the I/O port 105.

For example, the EFI-ECU 100 adjusts a fuel injection amount Iq of the fuel injection valve 18. More specifically, the EFI-ECU 100 changes at least one of the fuel injection time and fuel injection pressure of the fuel injection valve 18, thereby controlling the fuel injection amount Iq.

The EFI-ECU 100 is connected to the heating ECU 200 via a high-speed controller area network (a high-speed CAN). The heating ECU 200 is constituted by a microprocessor that is equipped with a CPU 201, a RAM 202, a ROM 203, a flash memory 204, and an I/O port 205.

A program for causing the microprocessor to function as the heating ECU 200 is stored in the ROM 203 of the heating ECU 200. That is, the CPU 201 of the heating ECU 200 executes the program stored in the ROM 203, using the RAM 202 as a working area, whereby the microprocessor functions as the heating ECU 200.

The heating ECU 200 has a driver circuit 206 for driving each heater 19. The heating ECU 200 operates or stops each heater 19 via the driver circuit 206, on the basis of a command signal that is transmitted from the EFI-ECU 100. In this manner, the heating ECU 200 cooperates with the heater 19 to constitute a fuel heating device that heats the fuel supplied to the engine 1.

It should be noted herein that the EFI-ECU 100, for example, operates each heater 19 via the heating ECU 200 on the condition that the engine coolant temperature T be lower than an engine coolant temperature Ton that is associated in advance with the alcohol concentration C, and stops each heater 19 via the heating ECU 200 on the condition that the engine coolant temperature T be equal to or higher than the engine coolant temperature Ton.

The EFI-ECU 100, which constitutes an injection correction amount adjustment device that adjusts the fuel injection amount Iq of the fuel injection valve 18, will be described hereinafter in detail. The EFI-ECU 100 determines the fuel injection amount Iq in accordance with a load factor of the engine 1 (hereinafter referred to simply as "an engine load factor") KL (=Ga/Ne).

Besides, the EFI-ECU 100 corrects the fuel injection amount Iq by multiplying the fuel injection amount Iq by an incremental correction coefficient Cc that is determined in advance as a specification value of a vehicle, and an air-fuel ratio feedback (hereinafter referred to simply as "A/F") correction coefficient Cf corresponding to an air-fuel ratio detected by the air-fuel ratio sensor 24.

It should be noted herein that the incremental correction coefficient Cc is experimentally determined in advance, and is stored in the ROM 103 of the EFI-ECU 100. Besides, the EFI-ECU 100 calculates the A/F coefficient Cf through known feedback control such as proportional integral derivative (PID) control, such that the air-fuel ratio detected by the air-fuel ratio sensor 24 approaches a target air-fuel ratio. It should be noted herein that the target air-fuel ratio is experimentally determined in advance, and is stored in the ROM 103 of the EFT-ECU 100.

The EFI-ECU 100 performs fuel manifold wet (FMW) control for suppressing fluctuations in the air-fuel ratio of fuel adhering to a wall surface in the vicinity of an input port of the engine 1. The EFI-ECU 100 further corrects the fuel injection amount Iq by adding an FMW correction amount Iw in FMW control to the fuel injection amount Iq.

It should be noted herein that the EFI-ECU 100 estimates a wall surface adhesion amount on the basis of a wall surface adhesion amount association map in which the amount of fuel adhering to the wall surface (hereinafter referred to simply as "a wall surface adhesion amount") is associated with the engine coolant temperature T, the engine load factor KL, the engine rotational speed Ne, timings for opening/closing the intake valve 6 and the exhaust valve 7, and the alcohol concentration C. The wall surface adhesion amount association map is experimentally determined in advance, and is stored in the ROM 103 of the EFI-ECU 100.

The EFI-ECU 100 calculates a difference between a wall surface adhesion amount estimated last time and a wall surface adhesion amount estimated this time, every time the operation of the engine 1 undergoes one cycle, namely, every time the crankshaft 5 rotates by 720°.

The EFI-ECU 100 distributes the difference between the calculated wall surface adhesion amounts to an instantaneous correction amount and a persistent correction amount at a predetermined ratio. In this manner, the EFI-ECU 100 calculates the FMW correction amount Iw according to FMW control, through the distribution to the instantaneous correction amount and the persistent correction amount.

Besides, the EFI-ECU 100 corrects the calculated FMW correction amount Iw during a startup period of the engine 1. It should be noted herein that the startup period of the engine 1 means, for example, a period from a timing when the engine rotational speed of the engine 1 becomes equal to 400 rpm to a timing when the cumulative engine rotational speed of the engine 1 becomes equal to a predetermined rotational speed during startup of the engine.

Incidentally, the EFI-ECU 100 determines the predetermined rotational speed on the basis of an operation state of the engine 1 such as the engine coolant temperature T and the like. In this embodiment of the invention, the startup period of the engine 1 is approximately equal to or shorter than 60 seconds.

The EFI-ECU 100 adjusts the correction amount of the fuel injection amount such that the correction amount of the fuel injection amount in a state where the heater 19 is out of operation and the correction amount of the fuel injection amount in a state where the heater 19 is in operation become different from each other, during the startup period of the engine 1.

Figure 2A:
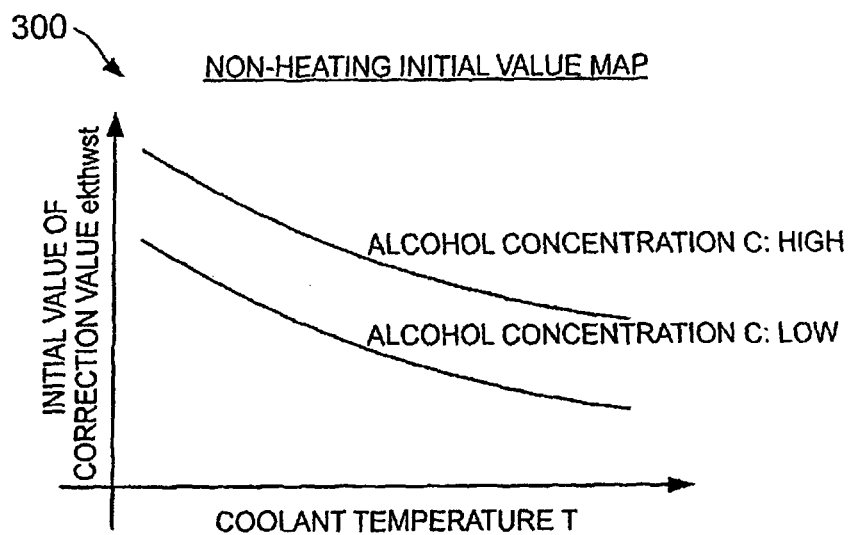
FIG. 2A is a conceptual view showing a non-heating initial value map referred to by an EFI-ECU that constitutes the fuel injection amount control device according to the first embodiment of the invention.
Figure 2B:
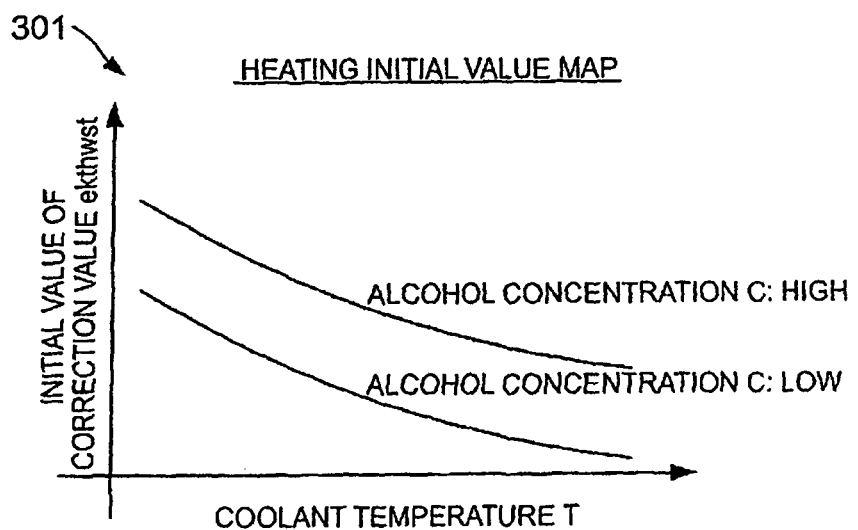
FIG. 2B is a conceptual view showing a heating initial value map referred to by an EFI-ECU that constitutes the fuel injection amount control device according to the first embodiment of the invention.

More specifically, as shown in FICA 2A and FIG. 2B, a non-heating initial value map 300 that is referred to in the state where the heater 19 is out of operation and a heating initial value map 301 that is referred to in the state where the heater 19 is in operation are experimentally determined in advance, and are stored in the ROM 103 of the EFI-ECU 100.

In each of the non-heating initial value map 300 and the heating initial value map 301, an initial value of a correction value ekthwst during the startup period is associated with the engine coolant temperature T during startup of the engine and the alcohol concentration C.

Each of the initial value maps is set such that the initial value of the correction value ekthwst decreases as the engine coolant temperature T during startup of the engine rises, and that the initial value of the correction value ekthwst increases as the alcohol concentration C rises. Besides, each initial value of the correction value ekthwst is set lower under the same condition in the heating initial value map 301 than in the non-heating initial value map 300.

The EFI-ECU 100 determines the initial value of the correction value ekthwst with reference to the non-heating initial value map 300 in the state where the heater 19 is out of operation, and with reference to the heating initial value map 301 in the state where the heater 19 is in operation.

The EFI-ECU 100 adjusts the correction amount of the fuel injection amount in the state where the heater 19 is in operation, such that the difference between the correction amount of the fuel injection amount in the state where the heater 19 is out of operation and the correction amount of the fuel injection amount in the state where the heater 19 is in operation decreases in accordance with engine rotation of the engine 1, during the startup period of the engine 1.

Figure 3:
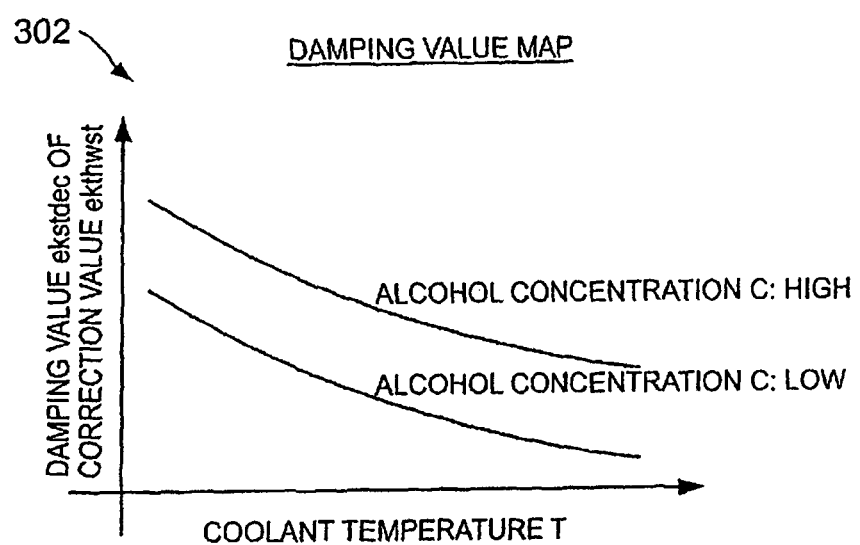
FIG. 3 is a conceptual view showing a damping value map that is referred to by the EFI-ECU that constitutes the fuel injection amount control device according to the first embodiment of the invention.

More specifically, as shown in FIG. 3, a damping value map 302 in which a damping value ekstdec of the correction value ekthwst is associated with the engine coolant temperature T during startup of the engine and the alcohol concentration C is experimentally determined in advance, and is stored in the ROM 103 of the EFI-ECU 100.

The damping value map 302 is set such that the damping value ekstdec decreases as the engine coolant temperature T during startup of the engine rises, and that the damping value ekstdec increases as the alcohol concentration C rises.

The EFI-ECU 100 subtracts the damping value ekstdec from the correction value ekthwst until the correction value ekthwst becomes equal to 0, for example, every time the rotational angle of the crankshaft 5 changes by 90° (90° CA).

Besides, the EFI-ECU 100 calculates a startup correction coefficient ekmw by adding the correction value ekthwst to 1.0. The EFI-ECU 100 corrects the FMW correction amount Iw by multiplying the FMW correction amount Iw by the startup correction coefficient ekmw.

A fuel injection amount determination operation that is performed by the EFI-ECU 100 configured as described above will be described with reference to FIG. 4. Incidentally, the fuel injection amount determination operation that will be described hereinafter is repeatedly performed for each of the cylinders from startup of the engine to stop of the engine 1.

First of all, the EFI-ECU 100 determines whether or not the heater 19 is in operation (step S1). It should be noted herein that if it is determined that the heater 19 is out of operation, the EFI-ECU 100 determines the initial value of the correction value ekthwst corresponding to the engine coolant temperature T during startup of the engine and the alcohol concentration C, with reference to the non-heating initial value map 300 (step S2).

On the other hand, if it is determined that the heater 19 is in operation, the EFI-ECU 100 determines the initial value of the correction value ekthwst corresponding to the engine coolant temperature T during startup of the engine and the alcohol concentration C, with reference to the heating initial value map 301 (step S3).

If the initial value of the correction value ekthwst is determined, the EFI-ECU 100 determines the damping value ekstdec corresponding to the engine coolant temperature T during startup of the engine and the alcohol concentration C, with reference to the damping value map 302 (step S4). Subsequently, the EFI-ECU 100 subtracts the damping value ekstdec from the correction value ekthwst until the correction value ekthwst becomes equal to 0 at intervals of 90° CA (step S5).

Subsequently, the EFI-ECU 100 calculates a startup correction coefficient ekmw by adding the correction value ekthwst to 1.0 (step S6). Subsequently, the EFI-ECU 100 corrects the FMW correction amount Iw by multiplying the FMW correction amount Iw by the startup correction coefficient ekmw (step S7).

Subsequently, the EFI-ECU 100 corrects the fuel injection amount Iq by multiplying the fuel injection amount Iq corresponding to the engine load factor KL by the incremental correction coefficient Cc and the A/F coefficient Cf and adding the post-correction FMW correction amount Iw to the product (step S8), and determines the fuel injection amount Iq.

Figure 5:
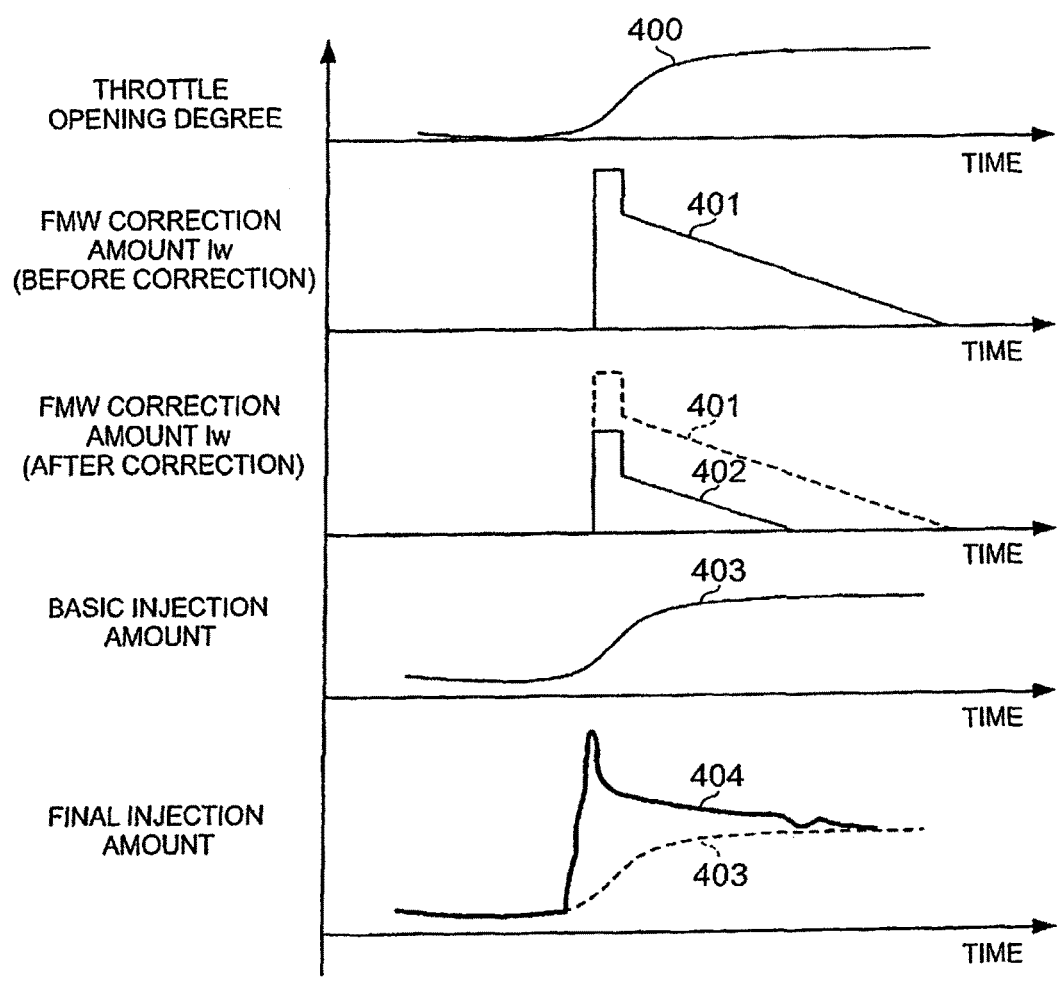
FIG. 5 includes timing charts for explaining the mechanism of the fuel injection amount determination operation of the fuel injection amount control device according to the first embodiment of the invention.

Next, the mechanism of the fuel injection amount determination operation that is performed by the EFI-ECU 100 will be described with reference to FIG. 5.

During the startup period of the engine 1, if the throttle opening degree rises as indicated by a reference numeral 400, the FMW correction amount Iw according to conventional FMW control is denoted by a reference numeral 401. On the other hand, the FMW correction amount Iw according to this embodiment of the invention is denoted by a reference numeral 402 in the case where the heater 19 is in operation. In this manner, in the state where the heater 19 is in operation during the startup period of the engine 1, the FMW correction amount Iw is smaller than when the heater 19 is in an out-of-operation state.

Thus, an excessive richness of the air-fuel ratio is prevented from being caused due to a relatively large amount of fuel injection resulting from a low temperature of coolant despite the promotion of the vaporization of fuel through heating by the heater 19, during the startup period of the engine 1.

Besides, an excessive richness of the air-fuel ratio is prevented from being caused due to a relatively large amount of fuel injection resulting from a relatively large estimated amount of fuel adhering to the wall surface, despite a decrease in the amount of fuel adhering to the wall surface in the vicinity of the input port of the engine 1 through the heating of fuel by the heater 19, during the startup period of the engine 1.

Incidentally, the fuel injection amount Iq (hereinafter referred to also as "a basic injection amount") that is corrected by multiplying the fuel injection amount Iq corresponding to the engine load factor KL by the incremental correction coefficient Cc and the A/F coefficient Cf is denoted by a reference numeral 403. In contrast, the fuel injection amount Iq (hereinafter referred to also as "a final injection amount") that is corrected by adding the FMW correction amount Iw to the basic injection amount is denoted by a reference numeral 404.

As described above, this embodiment of the invention makes it possible to improve the startup performance of the engine 1 in comparison with the conventional art, because the correction amount of the fuel injection amount is adjusted depending on whether or not fuel is heated during the startup period of the engine 1.

Incidentally, this embodiment of the invention has been described on the assumption that the engine rotational speed of the engine 1 does not fall during the startup period of the engine 1. However, the EFI-ECU 100 may refrain from correcting the FMW correction amount Iw in step 7 of the fuel injection amount determination operation described with reference to FIG. 4 in the case where the engine rotational speed of the engine 1 has fallen.

Besides, this embodiment of the invention has been described on the assumption that the non-heating initial value map 300 that is referred to in the state where the heater 19 is out of operation and the heating initial value map 301 that is referred to in the state where the heater 19 is in operation are experimentally determined in advance and stored in the ROM 103 of the EFI-ECU 100, and that the initial value of the correction value ekthwst during the startup period is associated with each of the engine coolant temperature T during startup of the engine and the alcohol concentration C in each of the non-heating initial value map 300 and the heating initial value map 301.

Figure 6:
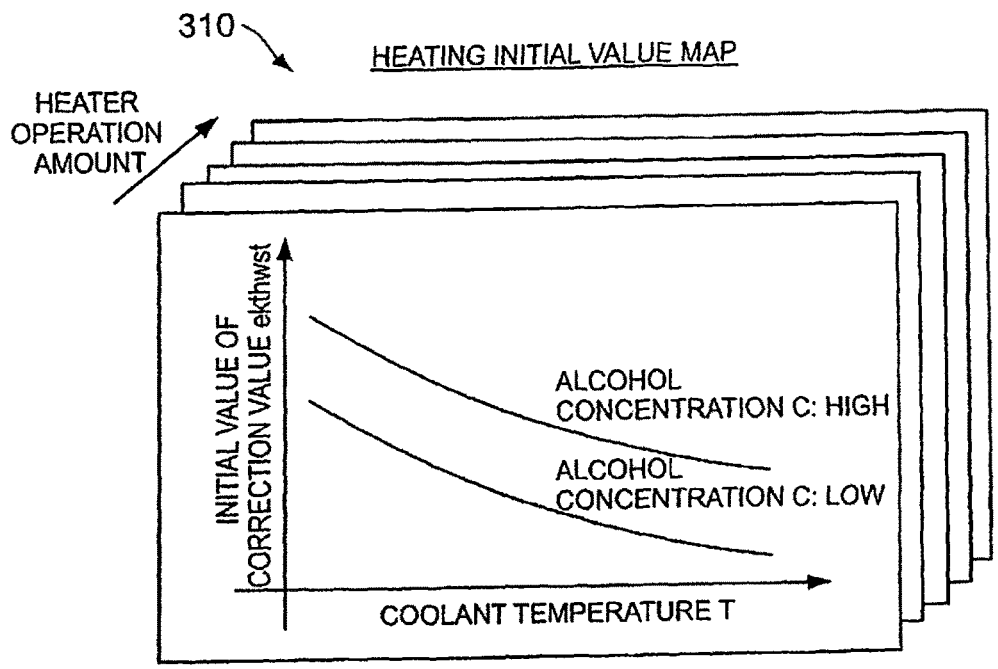
FIG. 6 is a conceptual view showing a heating initial value map of another aspect that is referred to by the EFI-ECU that constitutes the fuel injection amount control device according to the first embodiment of the invention.

In contrast, a heating initial value map 310 as shown in FIG. 6 may be experimentally determined in advance and stored in the ROM 103 of the EFI-ECU 100, instead of the non-heating initial value map 300 and the heating initial value map 301.

In the heating initial value map 310, the initial value of the correction value ekthwst during the startup period is associated with each of the engine coolant temperature T during startup of the engine, the alcohol concentration C, and an operation amount of the heater 19 (hereinafter referred to also as "a heater operation amount").

The heating initial value map 310 is set such that the initial value of the correction value ekthwst decreases as the engine coolant temperature T during startup of the engine rises, that the initial value of the correction value ekthwst increases as the alcohol concentration C rises, and that the initial value of the correction value ekthwst decreases as the heater operation amount increases.

It should be noted herein that the heater operation amount is equivalent to a controlled variable such as a control voltage, a control current or the like that is output from the EFI-ECU 100 to the heater 19. In this case, the EFI-ECU 100 refers to the heating initial value map 310 on the assumption that the heater operation amount is 0, in the case where the heater 19 is out of operation.

Figure 4:
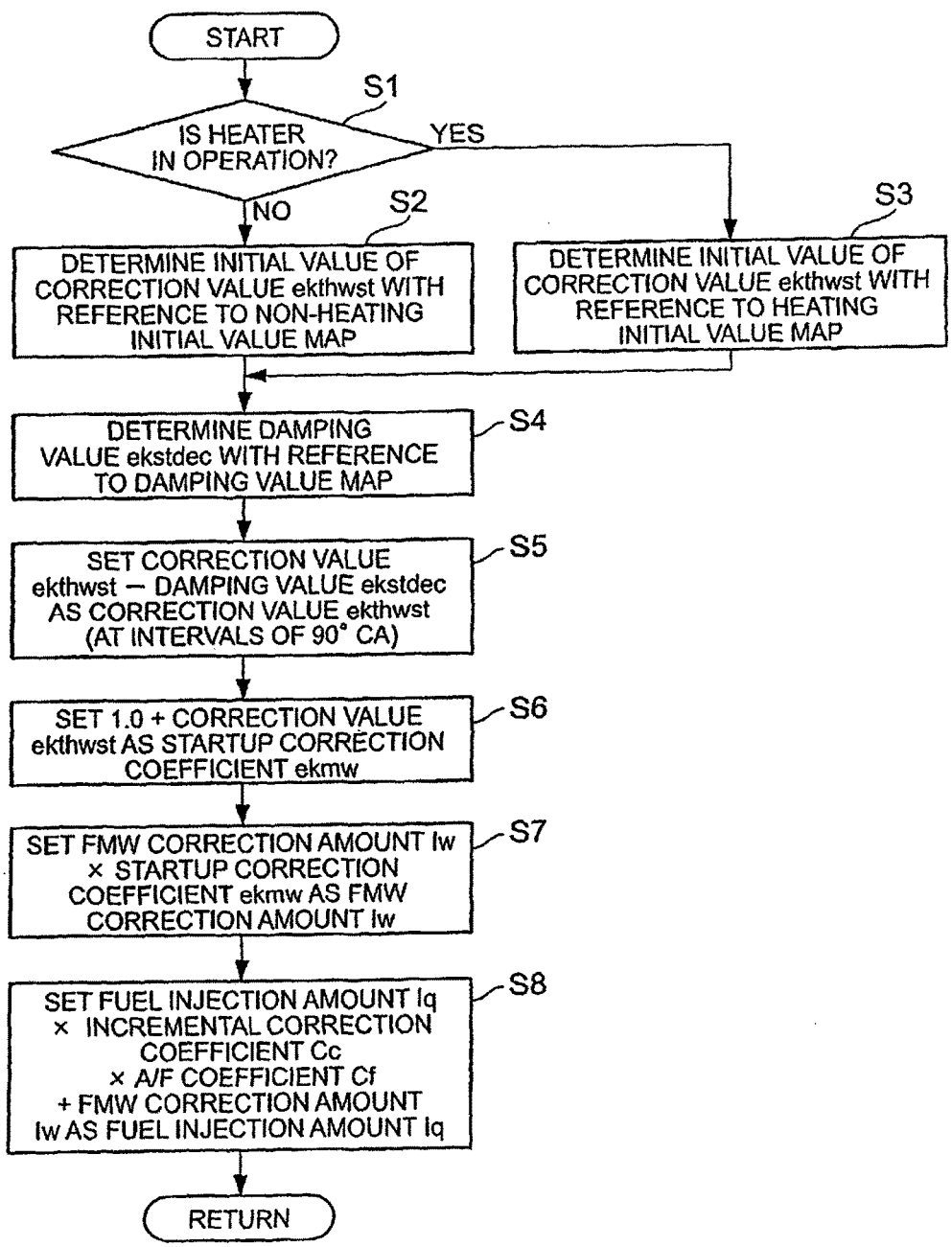
FIG. 4 is a flowchart for explaining a fuel injection amount determination operation of the fuel injection amount control device according to the first embodiment of the invention.

By being thus configured, the EFI-ECU 100 may determine the initial value of the correction value ekthwst corresponding to the engine coolant temperature T during startup of the engine, the alcohol concentration C, and the heater operation amount with reference to the heating initial value map 310, in steps S1 to S3 of the fuel injection amount determination operation described with reference to FIG. 4.

Besides, this embodiment of the invention has been described on the assumption that the damping value map 302 in which the damping value ekstdec of the correction value ekthwst is associated with the engine coolant temperature T during startup of the engine and the alcohol concentration C is experimentally determined in advance and stored in the ROM 103 of the EFI-ECU 100.

Figure 7:
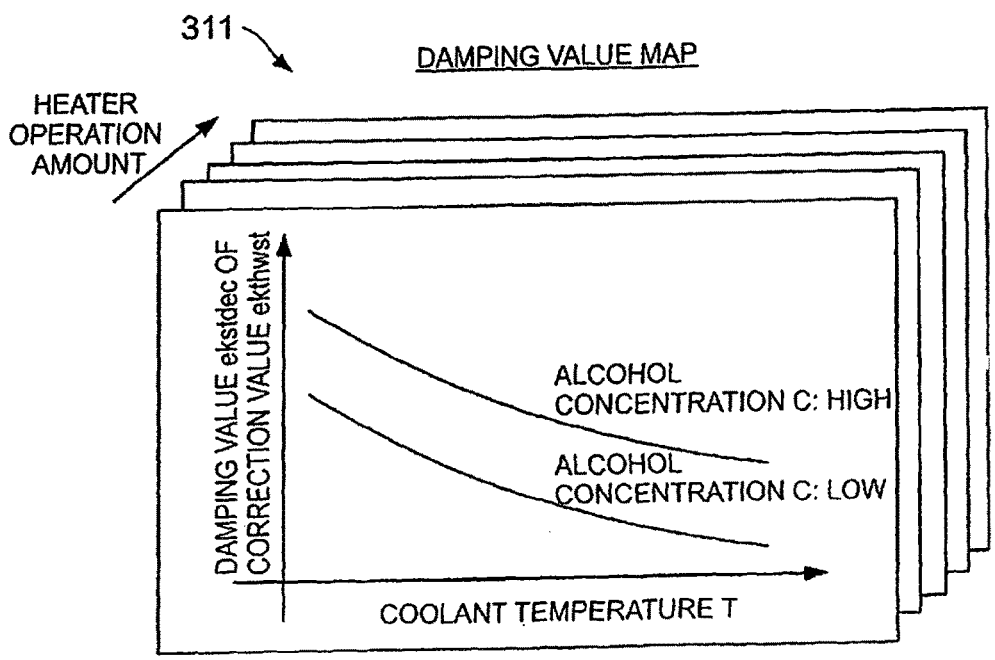
FIG. 7 is a conceptual view showing a damping value map of another aspect that is referred to by the EFI-ECU that constitutes the fuel injection amount control device according to the first embodiment of the invention.

In contrast, as shown in FIG. 7, a damping value map 311 in which the damping value ekstdec of the correction value ekthwst is associated with the engine coolant temperature T during startup of the engine, the alcohol concentration C, and the heater operation amount may be experimentally determined in advance and stored in the ROM 103 of the EFI-ECU 100.

The damping value map 311 is set such that the damping value ekstdec decreases as the engine coolant temperature T during startup of the engine rises, and such that the damping value ekstdec increases as the alcohol concentration C rises, and that the damping value ekstdec increases as the heater operation amount increases.

By being thus configured, the EFI-ECU 100 determines the damping value ekstdec corresponding to the engine coolant temperature T during startup of the engine, the alcohol concentration C, and the heater operation amount with reference to the damping value map 311, in step S4 of the fuel injection amount determination operation described with reference to FIG. 4.

That is, the EFI-ECU 100 may adjust the correction amount of the fuel injection amount such that the damping factor of the correction amount of the fuel injection amount in the state where the heater 19 is in operation rises as the heater operation amount increases, during the startup period of the engine 1.

Besides, the EFI-ECU 100 may adjust the correction amount of the fuel injection amount such that the damping factor of the correction amount of the fuel injection amount in the state where the heater 19 is in operation falls as the heater operation amount decreases, during the startup period of the engine 1.

Second Embodiment

In this embodiment of the invention, the difference from the first embodiment of the invention will be described. Besides, those components according to this embodiment of the invention which are the same as in the first embodiment of the invention are denoted by the same reference symbols respectively, and the difference therebetween will be described.

The first embodiment of the invention has been described on the assumption that the engine rotational speed of the engine 1 does not fall during the startup period of the engine 1. However, this embodiment of the invention also takes into account a case where the engine rotational speed of the engine 1 has fallen during the startup period of the engine 1.

More specifically, in addition to the non-heating initial value map 300 and the heating initial value map 301, a deceleration heating initial value map that is referred to when the engine rotational speed of the engine 1 has fallen in the state where the heater 19 is in operation (hereinafter referred to as "a time when the engine rotational speed has fallen") is experimentally determined in advance and stored in the ROM 103 of the EFI-ECU 100.

In the state where the heater 19 is out of operation, the EFI-ECU 100 determines an initial value of the correction value ekthwst with reference to the non-heating initial value map 300, and determines the determined initial value of the correction value ekthwst as an initial value of a correction value ekthwsta at the time when the engine rotational speed of the engine 1 has not fallen (hereinafter referred to as "a time when the engine rotational speed has failed to fall") and an initial value of a correction value ekthwstd at the time when the engine rotational speed has fallen.

Besides, in the state where the heater 19 is in operation, the EFI-ECU 100 determines an initial value of the correction value ekthwst with reference to the non-heating initial value map 300, and determines the determined initial value of the correction value ekthwst as an initial value of the correction value ekthwsta at the time when the engine rotational speed has failed to fall.

Besides, in the state where the heater 19 is in operation, the EFI-ECU 100 determines an initial value of the correction value ekthwstd at the time when the engine rotational speed has fallen, with reference to the deceleration heating initial value map. While the respective initial values of the correction value ekthwst are set on the positive side in the heating initial value map 301, the respective initial values of the correction value ekthwstd are set on the negative side in the deceleration heating initial value map.

In addition to the damping value map 302, a deceleration damping value map is experimentally determined in advance and stored in the ROM 103 of the EFI-ECU 100. While the respective damping values ekstdec are set on the positive side in the damping value map 302, respective damping values ekstdecd are set on the negative side in the deceleration heating initial value map. Besides, the absolute values of the respective damping values ekstdecd in the deceleration damping value map are set higher than the absolute values of the respective damping values ekstdec in the damping value map 302, under the same condition.

The EFI-ECU 100 determines the damping value ekstdec with reference to the damping value map 302, and determines the determined damping value ekstdec as a damping value ekstdeca at the time when the engine rotational speed has failed to fall. Besides, the EFI-ECU 100 determines the damping value ekstdecd at the time when the engine rotational speed has fallen, with reference to the deceleration damping value map.

The EFI-ECU 100 subtracts the damping value ekstdeca from the correction value ekthwsta until the correction value ekthwsta becomes equal to 0, at intervals of 90° CA. By the same token, the EFI-ECU 100 subtracts the damping value ekstdecd from the correction value ekthwstd until the correction value ekthwstd becomes equal to 0, at intervals of 90° CA. Incidentally, since the correction value ekthwstd and the damping value ekstdecd are negative values, the correction value ekthwstd approaches 0 from the negative side, at intervals of 90° CA.

Besides, the EFI-ECU 100 calculates a startup correction coefficient ekmwa at the time when the engine rotational speed has failed to fall, by adding the correction value ekthwsta to 1.0.

By the same token, the EFI-ECU 100 calculates a startup correction coefficient ekmwd at the time when the engine rotational speed has fallen, by adding the correction value ekthwstd to 1.0.

The EFI-ECU 100 corrects the FMW correction amount Iw by multiplying the FMW correction amount Iw by the startup correction coefficient ekmwa at the time when the engine rotational speed has failed to fall.

Besides, the EFI-ECU 100 corrects the FMW correction amount Iw by multiplying the FMW correction amount Iw by the startup correction coefficient ekmwd at the time when the engine rotational speed has fallen.

A fuel injection amount determination operation that is performed by the EFI-ECU 100 configured as described above will be described with reference to FIGS. 8 and 9. Incidentally, the fuel injection amount determination operation that will be described hereinafter is repeatedly performed for each of the cylinders, from startup of the engine to stop of the engine 1.

Figure 8:
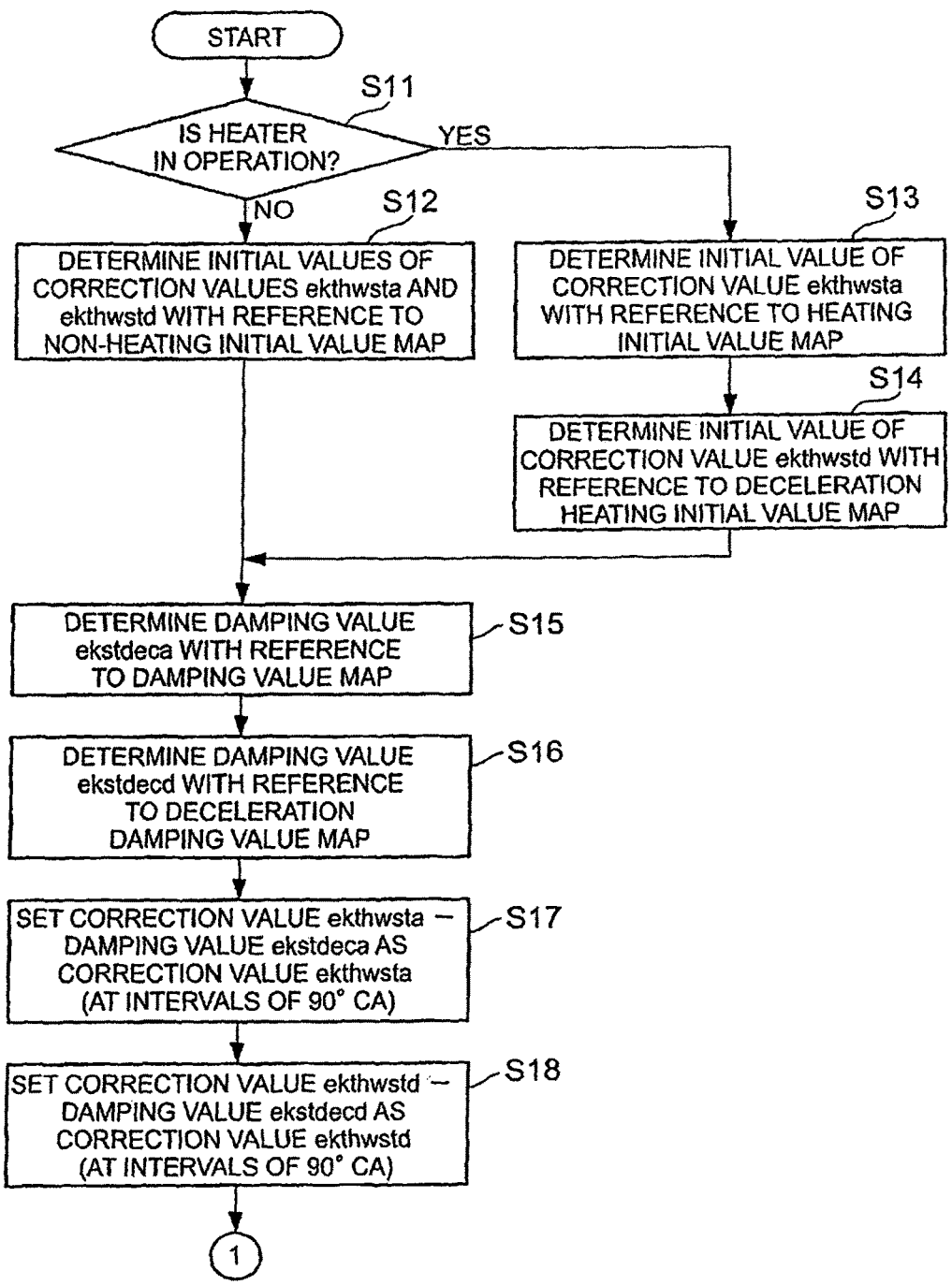
FIG. 8 is a flowchart for explaining a fuel injection amount determination operation of a fuel injection amount control device according to the second embodiment of the invention.

First of all, in FIG. 8, the EFI-ECU 100 determines whether or not the heater 19 is in operation (step S11). It should be noted herein that if it is determined that the heater 19 is out of operation, the EFI-ECU 100 determines the initial value of the correction value ekthwsta at the time when the engine rotational speed has failed to fall, which corresponds to the engine coolant temperature T during startup of the engine and the alcohol concentration C, and the initial value of the correction value ekthwstd at the time when the engine rotational speed has fallen, with reference to the non-heating initial value map 300 (step S12).

On the other hand, if it is determined that the heater 19 is in operation, the EFI-ECU 100 determines the initial value of the correction value ekthwsta at the time when the engine rotational speed has failed to fall, which corresponds to the engine coolant temperature T during startup of the engine and the alcohol concentration C, with reference to the heating initial value map 301 (step S13).

Besides, the EFI-ECU 100 determines the initial value of the correction value ekthwstd at the time when the engine rotational speed has fallen, which corresponds to the engine coolant temperature T during startup of the engine and the alcohol concentration C, with reference to the deceleration heating initial value map (step S14).

If the initial values of the correction values ekthwsta and ekthwstd are determined, the EFI-ECU 100 determines the damping value ekstdeca at the time when the engine rotational speed has failed to fall, which corresponds to the engine coolant temperature T during startup of the engine and the alcohol concentration C, with reference to the damping value map 302 (step S15).

Besides, the EFI-ECU 100 determines the damping value ekstdecd at the time when the engine rotational speed has fallen, which corresponds to the engine coolant temperature T during startup of the engine and the alcohol concentration C, with reference to the deceleration damping value map (step S16).

Subsequently, the EFI-ECU 100 subtracts the damping value ekstdeca from the correction value ekthwsta until the correction value ekthwst becomes equal to 0, at intervals of 90° CA (step S17). Besides, the EFI-ECU 100 subtracts the damping value ekstdecd from the correction value ekthwstd until the correction value ekthwst becomes equal to 0, at intervals of 90° CA (step S18).

Figure 9:
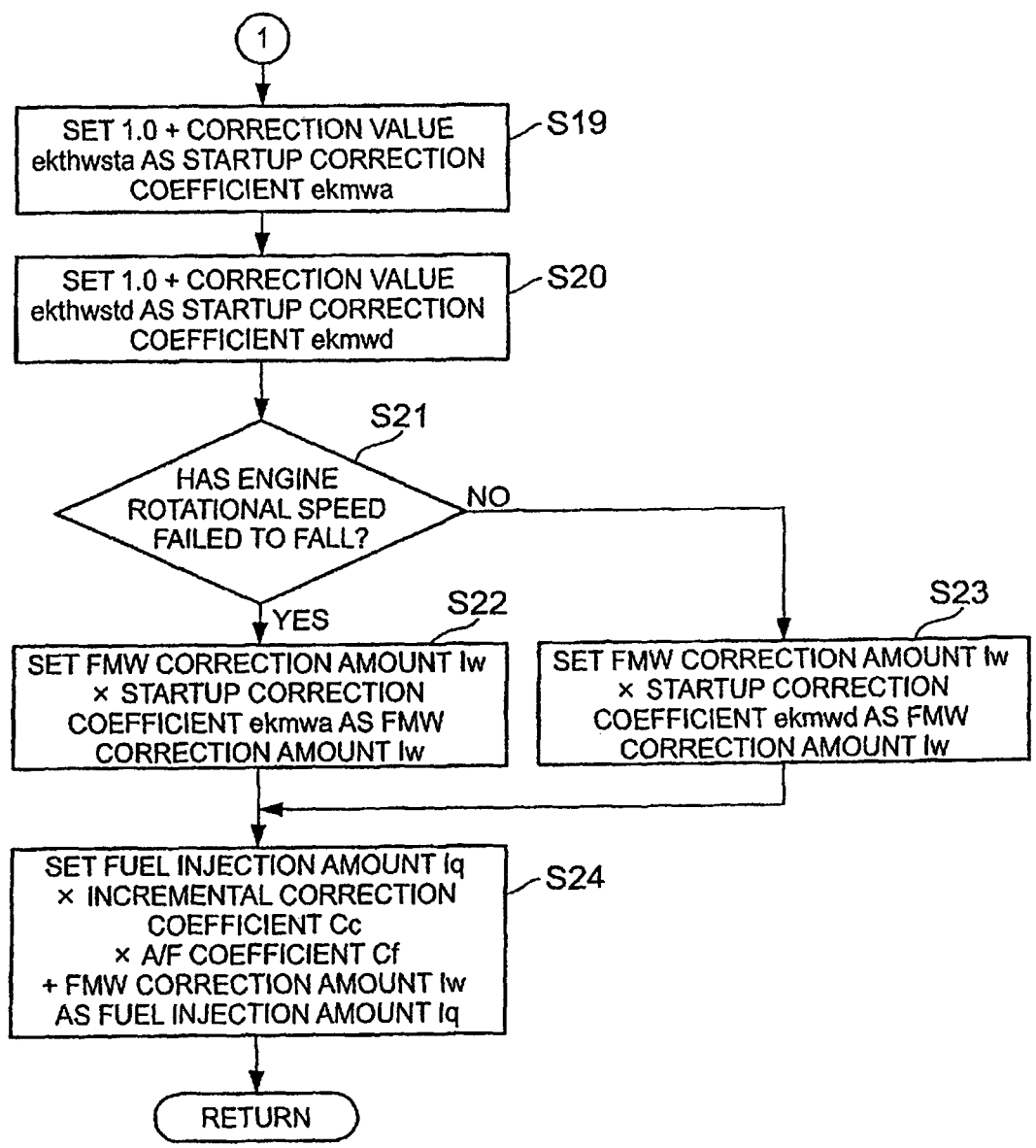
FIG. 9 is a flowchart that continues from FIG. 8.

Subsequently, in FIG. 9, the EFI-ECU 100 calculates the startup correction coefficient ekmwa at the time when the engine rotational speed has failed to fall, by adding the correction value ekthwsta to 1.0 (step S19). Besides, the EFI-ECU 100 calculates the startup correction coefficient ekmwd at the time when the engine rotational speed has fallen, by adding the correction value ekthwstd to 1.0 (step S20).

Subsequently, the EFI-ECU 100 determines whether or not the engine rotational speed has failed to fall (step S21). It should be noted herein that if it is determined that the engine rotational speed has failed to fall, the EFI-ECU 100 corrects the FMW correction amount Iw by multiplying the FMW correction amount Iw by the startup correction coefficient ekmwa (step S22).

On the other hand, if it is determined that the engine rotational speed has not failed to fall, the EFI-ECU 100 corrects the FMW correction amount Iw by multiplying the FMW correction amount Iw by the startup correction coefficient ekmwd (step S23).

Subsequently, the EFI-ECU 100 corrects the fuel injection amount Iq by multiplying the fuel injection amount Iq corresponding to the engine load factor KL by the incremental correction coefficient Cc and the A/F coefficient Cf, and adding the post-correction FMW correction amount Iw to the product (step S24), and determines the fuel injection amount Iq.

As described above, this embodiment of the invention has an effect similar to that of the first embodiment of the invention. Furthermore, this embodiment of the invention can prevent an excessive leanness of the air-fuel ratio from being caused due to a relatively small amount of fuel injection despite an increase in the wall surface adhesion amount resulting from a fall in the engine rotational speed of the engine 1.

Incidentally, in this embodiment of the invention as well, the heating initial value map 310 as shown in FIG. 6 may be experimentally determined in advance and stored in the ROM 103 of the EFI-ECU 100, instead of the non-heating initial value map 300 and the heating initial value map 301.

In this case, in the deceleration heating initial value map that is stored in the ROM 103 of the EFI-ECU 100, as well as the heating initial value map 310, the initial value of the correction value ekthwst during the startup period is associated with each of the engine coolant temperature T during startup of the engine, the alcohol concentration C, and the heater operation amount.

By being thus configured, the EFI-ECU 100 determines the initial value of the correction value ekthwst corresponding to the engine coolant temperature T during startup of the engine, the alcohol concentration C, and the heater operation amount, as the initial value of the correction value ekthwsta, with reference to the heating initial value map 310, in steps S11 to S14 of the fuel injection amount determination operation described with reference to FIGS. 8 and 9.

Besides, the EFI-ECU 100 determines the initial value of the correction value ekthwstd corresponding to the engine coolant temperature T during startup of the engine, the alcohol concentration C, and the heater operation amount, with reference to the deceleration heating initial value map, in steps S11 to S14 of the fuel injection amount determination operation described with reference to FIGS. 8 and 9.

Besides, in this embodiment of the invention as well, as shown in FIG. 7, the damping value map 311 in which the damping value ekstdec of the correction value ekthwst is associated with the engine coolant temperature T during startup of the engine, the alcohol concentration C, and the heater operation amount may be experimentally determined in advance and stored in the ROM 103 of the EFI-ECU 100.

By being thus configured, the EFI-ECU 100 determines the damping value ekstdec corresponding to the engine coolant temperature T during startup of the engine, the alcohol concentration C, and the heater operation amount, as the damping value ekstdea, with reference to the damping value map 311, in step S15 of the fuel injection amount determination operation described with reference to FIGS. 8 and 9.

Besides, in the deceleration damping value map that is stored in the ROM 103 of the EFI-ECU 100, as well as the damping value map 311, the damping value ekstdecd of the correction value ekthwstd is associated with the engine coolant temperature T during startup of the engine, the alcohol concentration C, and the heater operation amount.

Besides, the EFI-ECU 100 determines the damping value ekstdecd corresponding to the engine coolant temperature T during startup of the engine, the alcohol concentration C, and the heater operation amount, with reference to the deceleration damping value map, in step S16 of the fuel injection amount determination operation described with reference to FIGS. 8 and 9.

As described above, the fuel injection amount control device according to the invention has an effect of making it possible to improve the startup performance of the internal combustion engine in comparison with the conventional art, and is useful as a fuel injection amount control device that is applied to an FFV engine.

What is claimed is:

1. A fuel injection amount control device for an internal combustion engine, the internal combustion engine being configured to inject fuel into an intake port, the fuel including an alcohol, the fuel injection amount control device comprising:
   a fuel heater configured to heat the fuel based on a coolant temperature of the internal combustion engine; and
   an electronic control unit operatively coupled with the fuel heater and a fuel injection valve, the electronic control unit being configured to:
   determine and set an initial value of a correction amount of a fuel injection amount and a damping value of the fuel injection amount for the internal combustion engine, the initial value of the correction amount and the damping value being based on the coolant temperature and an alcohol concentration of the fuel during a startup of the internal combustion engine, such that: (i) the initial value of the correction amount decreases as the coolant temperature increases and the initial value of the correction amount increases as the alcohol concentration increases, and (ii) the damping value decreases as the coolant temperature increases and the damping value increases as the alcohol concentration increases, the initial value of the correction amount being set such that the initial value in a state where the fuel heater is in operation is smaller than the initial value in a state where the fuel heater is out of operation;

adjust the correction amount of the fuel injection amount for the internal combustion engine based on the coolant temperature and the alcohol concentration of the fuel during a startup period of the internal combustion engine such that fluctuations in an air fuel ratio of the fuel adhering to a wall surface in the intake port are suppressed, the correction amount being adjusted during the startup period by starting at the initial value of the correction amount and decreasing the initial value by subtracting the damping value from the initial value of the correction amount after each of a plurality of intervals of time, such that after a first interval of the plurality of intervals of time, the adjusted correction amount is then set as the initial value of the correction amount of a second, subsequent, interval of the plurality of intervals of time;

adjust the fuel injection amount during the startup of the internal combustion engine based on the adjusted correction amount; and transmit a signal to the fuel injection valve to inject the fuel into the intake port based on the adjusted fuel injection amount.

2. The fuel injection amount control device according to claim 1, wherein the electronic control unit is configured to adjust the correction amount of the fuel injection amount such that the damping value of the fuel injection amount in the state where the fuel heater is in operation increases as an operation amount of the fuel heater increases, during the startup period of the internal combustion engine.

3. The fuel injection amount control device according to claim 2, wherein the operation amount of the fuel heater is a control voltage to the fuel heater or a control current to the fuel heater.

4. The fuel injection amount control device according to claim 1, wherein the electronic control unit is configured to adjust the correction amount of the fuel injection amount such that the damping value of the fuel injection amount in the state where the fuel heater is in operation decreases as an operation amount of the fuel heater decreases, during the startup period of the internal combustion engine.

5. The fuel injection amount control device according to claim 4, wherein the operation amount of the fuel heater is a control voltage to the fuel heater or a control current to the fuel heater.

6. The fuel injection amount control device according to claim 1, wherein the startup period is a period from a timing when a rotational speed of the internal combustion engine becomes equal to a predetermined rotational speed, to a timing when a cumulative rotational speed of the internal combustion engine becomes equal to a predetermined cumulative rotational speed.

* * * * *